United States Patent [19] [11] 4,311,524
Genkin et al. [45] Jan. 19, 1982

[54] SINTERED IRON-BASED FRICTION MATERIAL

[76] Inventors: Valery A. Genkin, ulitsa Gaya, 38, kv.52; Alexandr A. Dmitrovich, bulvar Lunacharskogo, 5, kv.71; Efim I. Fishbein, ulitsa Brilevskaya, 14, kv.11, all of Minsk, U.S.S.R.

[21] Appl. No.: 136,304

[22] Filed: Apr. 1, 1980

[51] Int. Cl.³ .......................... C09K 3/14; C09K 3/18
[52] U.S. Cl. ........................................ 75/231; 75/232; 75/244; 75/246; 106/36; 188/251 A; 188/251 M; 192/107 M
[58] Field of Search ................. 75/231, 232, 244, 246; 106/36; 188/251 A, 251 M; 192/107 M

[56] References Cited
U.S. PATENT DOCUMENTS 3,008,225 11/1961 Healy ..................................... 106/36
3,660,120 5/1972 Clark et al. ........................... 106/36

Primary Examiner—Brooks H. Hunt
Attorney, Agent, or Firm—McAulay, Fields, Fisher, Goldstein & Nissen

[57] ABSTRACT

According to the invention, a sintered iron-based friction material comprises copper, tin, graphite, pyroceramic, lead, and zinc sulphide, the ratio of the components expressed in percent by mass being as follows:
copper: 1.5 to 3.0
tin: 1.0 to 2.0
zinc sulphide: 2.0 to 4.0
graphite: 6.0 to 10.0
pyroceramic: 2.0 to 5.0
lead: 10.0 to 20.0
the balance being iron.

2 Claims, No Drawings

SINTERED IRON-BASED FRICTION MATERIAL

FIELD OF THE INVENTION

The present invention relates to the powder metallurgy, more specifically to sintered materials, and more specifically to sintered iron-based friction materials.

The present invention can find application in friction devices to be used in cars, tractors, aircrafts, road-building machines, and other devices operating under liquid lubrication conditions at medium performance modes (peripheral speed of rotation of the friction member up to 9 m/s, unit pressure up to 25 kg/cm$^2$).

BACKGROUND OF THE INVENTION

There is wide use of sintered iron-based friction materials intended to operate both under dry friction and liquid lubrication conditions. Sintered (porous) friction materials consist of metallic and non-metallic components. Metallic components endow the material with strength, whereas non-metallic components enhance the coefficient of friction and decrease the tendency to jamming. Characteristic of sintered friction materials is a thin surface layer formed in the friction process, which plasticity and viscosity are determined by the components constituting the material.

The surface layer, more plastic when at room temperature, and especially at elevated temperatures, as compared with the bulk of the friction material, provides a positive gradient of mechanical properties in depth of the material and prevents effectively overdeformation. The plastic surface layer aids in reducing local unit pressures and surface temperatures and contributes to running-in. By running-in is meant the property of a friction material to increase, by means of wear or plastic deformation, the actual surface of mating. The surface layer of sintered friction materials should feature a heterogeneous structure, i.e. constitute a mixture of the base components and fine hard inclusions. The hard particles present in the surface layer contribute to resistance of the material to wear, since such particles being arranged favourably with respect to the mated surface take the major portion of the load under the force action. With a poor adhesion of the hard particles and the base material, the former are crambled out at high sliding speeds and, when ingressed in the friction zone, can result in an increased wear.

There is known a sintered iron-based friction material (cf., for example, a book by Ignatov L. I. "Proizvodstvo frictsionykh materialov na zheleznoi osnove", Metallurgya Publishers, Moscow, 1968) having the following chemical composition expressed in percent by mass:
copper: 15
graphite: 9
silicon oxide: 3
barium: 6
asbestos: 3
the balance being iron.

Another sintered iron-based friction material (cf., USSR Inventor's Certificate No. 358,401) is known to have the following chemical composition expressed in percent by mass:
copper: 9 to 25
manganese: 6.5 to 10
boron nitride: 6 to 12
boron carbide: 3 to 15
silicon carbide: 1 to 6
molybdenum disulphide: 2 to 5
the balance being iron.

Still another sintered iron-based friction material (cf., USSR Inventor's Certificate No. 379.665) is known to have the following chemical composition, in percent by mass:
copper: 1 to 3
tin: 0.5 to 2
barium sulphate: 3 to 5
graphite: 4 to 10
molybdenum disulphide: 2 to 6
pyroceramic: 1 to 3
lead: 0.1 to 4
the balance being iron.

Hard particles of silicon oxide, asbestos, boron carbide, silicon carbide, iron carbide, and iron oxide present in the above sintered iron-based friction materials as abrasive additions to increase the coefficient of friction are responsible for high temperatures (up to 900° C.) brought about on the surface of the mated materials under friction, which results in changing the structure of the surface layers of the material. The structural changes in turn result in decreased strength characteristics.

Thus, said sintered iron-based friction materials are known to exhibit inadequate strength characteristics and fail to provide the appropriate durability of friction devices wherein they are used.

There is also known a sintered iron-based friction material (cf., USSR Inventor's Certificate No. 503,927) comprising, in percent by mass:
copper: 4 to 15
nickel sulphate: 2 to 8
graphite: 4 to 10
pyroceramic: 2 to 10
lead: 2 to 8
the balance being iron.

Pyroceramic contained in said sintered iron-based friction material is loosely bound with the base, thus making the entire material weakened. Moreover, due to rather high content of abrasive particles in said friction material it is impossible to obtain perfect contact between the material and the body to be mated with, which affects adversely the running-in.

SUMMARY OF THE INVENTION

It is an object of the present invention to provide a sintered iron-based friction material featuring a high running-in.

Another object of the present invention is to provide a sintered iron-based friction material exhibiting an increased wear resistance in friction under liquid lubrication conditions at medium performance modes.

With these and other objects in view, there is provided a sintered iron-based friction material comprising copper, tin, graphite, pyroceramic, and lead, wherein, according to the invention there is introduced zinc sulphide, the ratio of the components taken in percent by mass, being as follows:
copper: 1.5 to 3
tin: 1.0 to 2.0
zinc sulphide: 2.0 to 4.0
graphite: 6.0 to 10.0
pyroceramic: 2.0 to 5.0
lead: 10.0 to 20.0
the balance being iron.

The sintered iron-based friction material of the proposed composition enjoys both high wear resistance and good running-in. This is determined by the fact that in the process of sintering, zinc sulphide which is a sulphide-forming addition is decomposed completely to yield zinc and sulphur. At the sintering temperature sulphur reacts with iron to yield iron sulphides, no iron oxides are therewith formed, which otherwise could affect adversely the wear resistance of the sintered iron-based friction material.

All sulphur recovered upon sintering goes into production of iron sulphides in distinction to the known sintered iron-based friction material having barium sulphate for the sulphide-forming component.

Zinc, having a low fusion temperature, and lead, which becomes somewhat softened on the friction surfaces and fills, under pressures as high as 25 kg/cm$^2$, the plurality of micro-roughnesses, make it possible to increase the area of tough contact between the material and the body to be mated with. The increase in the area of tough contact results in an improved running-in.

It is advisable that the ratio of the components in the sintered iron-based friction material be, in percent by mass, as follows:
 copper: 3
 tin: 2
 zinc sulphide: 3
 graphite: 8
 pyroceramic: 3
 lead: 20
 iron: 61.

With such a ratio of the components, the zinc sulphide content is the optimum one and provides all the sulphur available to go into the production of iron sulphides. With somewhat greater zinc sulphide content, sulphur inclusions will be found in the sintered iron-based friction material and amount of these increases as the zinc sulphide content increases. The free sulphur inclusions tend to decrease considerably compression and tensile strengths, impact strength, and hardness, thus resulting in a decreased wear resistance.

The proposed ratio of the components provides a sintered iron-based friction material showing the highest wear resistance and running-in.

These and other objects and novel features of the present invention are set forth in the appended claims and the present invention will best be understood from a consideration of the following detailed description of the preferred embodiments.

DETAILED DESCRIPTION OF THE PREFERRED EMBODIMENTS

Powders of graphite and zinc sulphide are dried at 150° C. All the initial powders, which are those of copper, tin, zinc sulphide, graphite, pyroceramic, lead, and iron, are then screened through sieves and weighed out according to their following contents, in percent by mass, in the mixture:
 copper: 1.5 to 3
 tin: 1 to 2
 zinc sulphide: 2 to 4
 graphite: 6 to 10
 pyroceramic: 2 to 5
 lead: 10 to 20
 the balance being iron.

All the components are stirred in a mixer in the presence of a neutral liquid, such as oil, for instance. The mixture thus prepared is pressed in a press mould under a unit pressure of 3 t/cm$^2$ and the resulting articles in the form of friction laps are sintered in a shaft furnace and simultaneously fritted to a steel base under a pressure of 20 kg/cm$^2$ and at a temperature of 1,030° C. for 3 hours.

The sintered iron-based friction materials obtained are tested for wear resistance and running-in on a test stand operating on the principle of braking rotary inertia masses.

The sintered iron-based friction material obtained has a wear of 4 to 6 mu after 100 brakings and a running-in of 90%.

As compared with the known material, wear resistance of the material under consideration is 2 to 3 times higher, running-in, 1.5 times higher.

The invention will be further described with reference to the following illustrative Examples.

EXAMPLE 1

Powders of graphite and zinc sulphide were dried at a temperature of 150° C. All the initial powders were then screened through sieves No. 0100 and No. 0160, weighed out in the following ratio, in percent by mass:
 copper: 1.5
 tin: 1.0
 zinc sulphide: 4.0
 graphite: 6.0
 pyroceramic: 2.0
 lead: 20.0
 iron: 65.5.

The components were stirred in a mixer in the presence of oil (0.5 percent of the mixture weight) for 6 hours. The slurry prepared was pressed in a press mould under a unit pressure of 3 t/cm$^2$ and then sintered in a shaft furnace and simultaneously fritted to a steel base under a pressure of 20 kg/cm$^2$ at a temperature of 1,030° C. for 3 hours.

The resulting sintered iron-based friction material was tested on a test stand operating on the principle of braking rotary inertia masses. The following test data were obtained:
 wear after 100 brakings: 5 mu
 running-in: 90%.

EXAMPLE 2

The intered iron-based friction material was produced essentially as described in Example 1 from powders taken in the following ratio, in percent by mass:
 copper: 3
 tin: 2
 zinc sulphide: 3
 graphite: 8
 pyroceramic: 3
 lead: 20
 iron: 61.

The material of the above composition featured the following characteristics:
 wear after 100 brakings: 4 mu
 running-in: 90%.

EXAMPLE 3

The sintered iron-based friction material was produced essentially as described in Example 1 from powders taken in the following ratio, in percent by mass:
 copper: 3
 tin: 2
 zinc sulphide: 2
 graphite: 10
 pyroceramic: 5
 lead: 10
 iron: 68.

The material of the above composition had the following characteristics:
- wear after 100 brakings: 6 mu
- running-in: 90%.

EXAMPLE 4

The sintered iron-based friction material was produced essentially as described in Example 1 from powders taken in the following ratio, in mass percent:
- copper: 1.5
- tin: 1.0
- zinc sulphide: 2.0
- graphite: 6.0
- pyroceramic: 2.0
- lead: 1.0
- iron: 77.5.

The material of the above composition featured the following characteristics:
- wear after 100 brakings: 5 mu
- running-in: 90%.

EXAMPLE 5

The sintered iron-based friction material was produced essentially as described in Example 1 from powders taken in the following ratio, in percent by mass:
- copper: 3
- tin: 2
- zinc sulphide: 4
- graphite: 10
- pyroceramic: 5
- lead: 20
- iron: 56.

The material of the above composition had the following characteristics:
- wear after 100 brakings: 5 mu
- running-in: 90%.

In the description of the various embodiments of the present invention disclosed above, specific narrow terminology has been resorted to for the sake of clarity. It should be understood, however, that the present invention is in no way limited to the terms so selected and that each such term covers all equivalent elements operating in a similar manner and employed for solving similar problems.

Though this invention has been described herein with reference to preferred exemplary embodiments thereof, it will be understood that minor changes may be made in the sintered iron-based friction material without departing from the spirit and scope of the invention, as will be readily understood by those skilled in the art.

All these alterations and changes will be considered to remain within the limits of the spirit and scope of the present invention.

We claim:

1. A sintered iron-based friction material comprising copper, tin, graphite, pyroceramic, lead, and zinc sulphide, the ratio of the components, in percent by mass, being as follows:
   - copper: 1.5 to 3.0
   - tin: 1.0 to 2.0
   - zinc sulphide: 2.0 to 4.0
   - graphite: 6.0 to 10.0
   - pyroceramic: 2.0 to 5.0
   - lead: 10.0 to 20.0
   - the balance being iron.

2. A sintered iron-based friction material according to claim 1 having the following ratio of the components, in percent by mass:
   - copper: 3.0
   - tin: 2.0
   - zinc sulphide: 3.0
   - graphite: 8.0
   - pyroceramic: 3.0
   - lead: 20.0
   - iron: 61.0.

* * * * *